(12) United States Patent
Garvey et al.

(10) Patent No.: US 9,645,875 B2
(45) Date of Patent: May 9, 2017

(54) INTELLIGENT INTER-PROCESS COMMUNICATION LATENCY SURVEILLANCE AND PROGNOSTICS

(71) Applicant: Oracle International Corporation, Redwood City, CA (US)

(72) Inventors: Dustin R. Garvey, Oakland, CA (US); Kenny C. Gross, Escondido, CA (US); Kalyanaraman Vaidyanathan, San Diego, CA (US); Debabrata Sarkar, San Jose, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 101 days.

(21) Appl. No.: 14/659,065

(22) Filed: Mar. 16, 2015

(65) Prior Publication Data

US 2016/0274966 A1 Sep. 22, 2016

(51) Int. Cl.
*G06F 11/00* (2006.01)
*G06F 11/07* (2006.01)
*G06F 11/30* (2006.01)

(52) U.S. Cl.
CPC ........ *G06F 11/079* (2013.01); *G06F 11/0706* (2013.01); *G06F 11/0757* (2013.01); *G06F 11/3058* (2013.01)

(58) Field of Classification Search
CPC .......................... G06F 11/079; G06F 11/3058
USPC .................................. 714/37, 43, 47.1–47.3
See application file for complete search history.

(56) References Cited

U.S. PATENT DOCUMENTS

| | | | |
|---|---|---|---|
| 7,243,265 B1 | 7/2007 | Wookey | |
| 7,801,650 B2 | 9/2010 | Gross | |
| 8,046,637 B2 * | 10/2011 | Gross | G06F 11/0724 714/26 |
| 8,661,299 B1 * | 2/2014 | Ip | H04L 43/0852 702/185 |
| 2013/0305092 A1 * | 11/2013 | Jayachandran | G06F 11/0754 714/37 |
| 2016/0004620 A1 * | 1/2016 | Ohike | G06F 11/3419 702/176 |

* cited by examiner

*Primary Examiner* — Joseph Kudirka
(74) *Attorney, Agent, or Firm* — Park, Vaughan, Fleming & Dowler LLP; Chia-Hsin Suen

(57) ABSTRACT

The disclosed embodiments provide a system that analyzes telemetry data from a computer system. During operation, the system obtains the telemetry data, which includes first information containing telemetric signals gathered using sensors in the computer system and second information that indicates one or more transaction latencies of software running on the computer system. Upon detecting an upward trend in the one or more transaction latencies, the system analyzes the telemetry data for a correlation between the one or more transaction latencies and one or more environmental factors represented by a subset of the telemetric signals. Upon identifying the correlation between the one or more transaction latencies and an environmental factor, the system stores an indication that the environmental factor may be contributing to the upward trend in the one or more transaction latencies.

18 Claims, 4 Drawing Sheets

INTELLIGENT INTER-PROCESS COMMUNICATION LATENCY SURVEILLANCE AND PROGNOSTICS

BACKGROUND

Field

The disclosed embodiments relate to techniques for monitoring and analyzing computer systems. More specifically, the disclosed embodiments relate to techniques for performing intelligent inter-process communication latency surveillance and prognostics.

Related Art

As electronic commerce becomes more prevalent, businesses are increasingly relying on enterprise computing systems to process ever-larger volumes of electronic transactions. A failure in one of these enterprise computing systems can be disastrous, potentially resulting in millions of dollars of lost business. More importantly, a failure can seriously undermine consumer confidence in a business, making customers less likely to purchase goods and services from the business. Hence, it is important to ensure reliability and/or high availability in such enterprise computing systems.

Not all failures in computer systems are caused by hardware issues. Instead, software aging in enterprise computing systems may result in problems such as hangs, crashes, and reduced performance. Such software aging may be caused by resource contention, memory leaks, accumulation of round-off errors, latching in shared memory pools, and/or other sources of software performance degradation. To manage software aging in complex enterprise computing systems, a multivariate pattern-recognition technique may be applied to performance parameters collected from the enterprise computing systems to trigger software rejuvenation in the enterprise computing systems when software aging is detected. Such proactive prediction and management of software aging is described in U.S. Pat. No. 7,100,079 (issued 29 Aug. 2006), by inventors Kenny C. Gross and Kishore S. Trivedi, entitled "Method and Apparatus for Using Pattern Recognition to Trigger Software Rejuvenation."

SUMMARY

The disclosed embodiments provide a system that analyzes telemetry data from a computer system. During operation, the system obtains the telemetry data, which includes first information containing telemetric signals gathered using sensors in the computer system and second information that indicates one or more transaction latencies of software running on the computer system. Upon detecting an upward trend in the one or more transaction latencies, the system analyzes the telemetry data for a correlation between the one or more transaction latencies and one or more environmental factors represented by a subset of the telemetric signals. Upon identifying the correlation between the one or more transaction latencies and an environmental factor, the system stores an indication that the environmental factor may be contributing to the upward trend in the one or more transaction latencies.

In some embodiments, upon detecting an increase in the one or more transaction latencies to over a high-latency threshold, the system generates a second alert indicating a hardware link failure in the computer system.

In some embodiments, the system also sets the high-latency threshold based on a distribution of historic transaction latencies in the computer system.

In some embodiments, upon detecting a lack of correlation between the one or more transaction latencies and any of the one or more environmental factors, the system performs one or more actions to remedy software aging in the computer system.

In some embodiments, the one or more actions include at least one of generating an alert of software aging in the computer system, and restarting one or more processes associated with the upward trend in the one or more transaction latencies.

In some embodiments, the subset of the telemetric signals includes a set of fan speeds, and the environmental factor includes a vibration level experienced by the computer system.

In some embodiments, the subset of the telemetric signals includes a set of temperatures, and the environmental factor includes read-after-write (RAW) operations in the computer system.

In some embodiments, the upward trend in the one or more transaction latencies is detected using a slope-estimation technique.

In some embodiments, analyzing the correlation between the one or more transaction latencies and the subset of the telemetric signals includes calculating a correlation coefficient between the one or more transaction latencies and the subset of the telemetric signals.

In some embodiments, the correlation between the one or more transaction latencies and the environmental factor is identified when the correlation coefficient exceeds a coefficient threshold.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
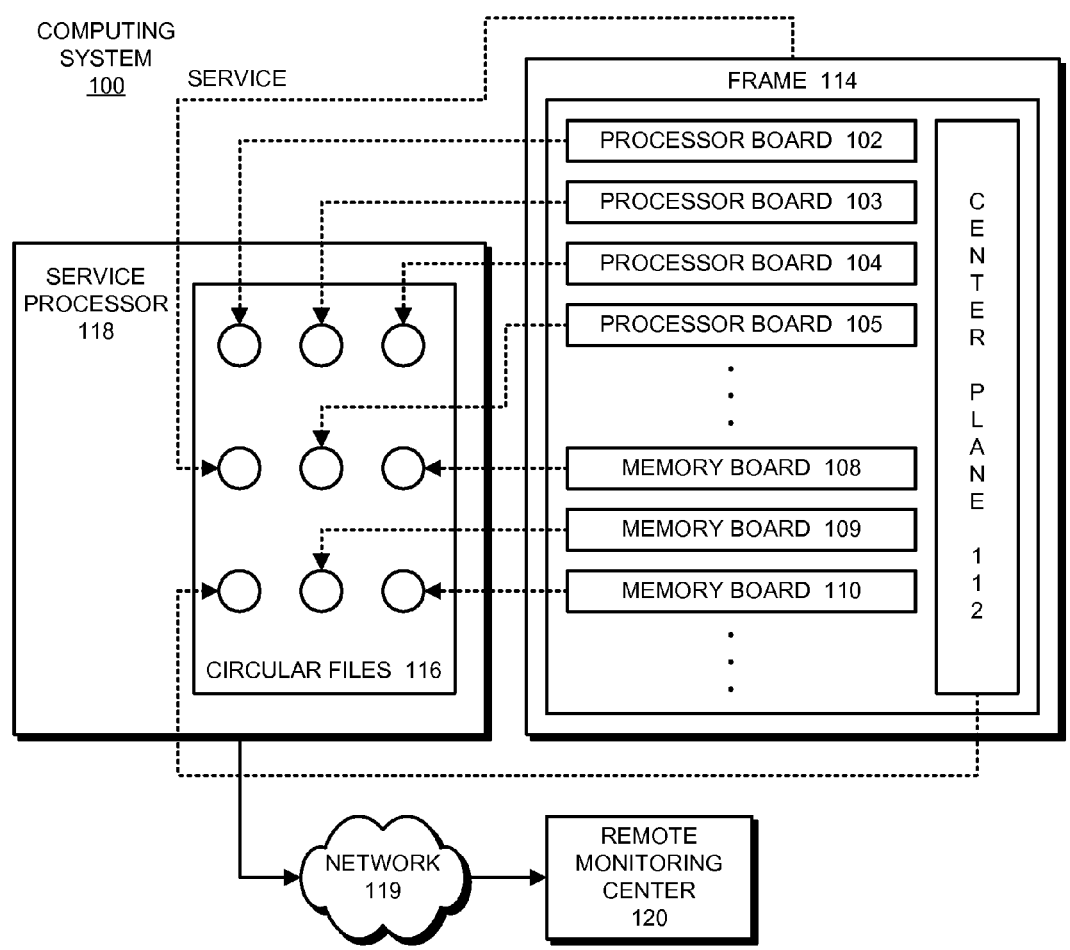
FIG. 1 shows a computer system that includes a service processor for processing telemetry signals in accordance with the disclosed embodiments.

The disclosed embodiments provide a method and system for analyzing telemetry data from a computer system. The telemetry data may be obtained from an operating system of the computer system, a set of sensors in the computer system, and/or one or more external sensors that reside outside the computer system. As shown in FIG. 1, a computer system 100 includes a number of processor boards 102-105 and a number of memory boards 108-110, which communicate with each other through center plane 112. These system components are all housed within a frame 114.

In one or more embodiments, these system components and frame 114 are all "field-replaceable units" (FRUs), which are independently monitored as is described below. Note that all major system units, including both hardware and software, can be decomposed into FRUs. For example, a software FRU can include an operating system, a middleware component, a database, and/or an application.

Computer system 100 is associated with a service processor 118, which can be located within computer system 100, or alternatively can be located in a standalone unit separate from computer system 100. For example, service processor 118 may correspond to a portable computing device, such as a mobile phone, laptop computer, personal digital assistant (PDA), and/or portable media player. Service processor 118 may include a monitoring mechanism that performs a number of diagnostic functions for computer system 100. One of these diagnostic functions involves recording performance parameters from the various FRUs within computer system 100 into a set of circular files 116 located within service processor 118. In one embodiment of the present invention, the performance parameters are recorded from telemetry signals generated from hardware sensors and software monitors within computer system 100. In one or more embodiments, a dedicated circular file is created and used for each FRU within computer system 100. Alternatively, a single comprehensive circular file may be created and used to aggregate performance data for all FRUs within computer system 100.

The contents of one or more of these circular files 116 can be transferred across network 119 to remote monitoring center 120 for diagnostic purposes. Network 119 can generally include any type of wired or wireless communication channel capable of coupling together computing nodes. This includes, but is not limited to, a local area network (LAN), a wide area network (WAN), a wireless network, and/or a combination of networks. In one or more embodiments, network 119 includes the Internet. Upon receiving one or more circular files 116, remote monitoring center 120 may perform various diagnostic functions on computer system 100, as described below with respect to FIG. 2. The system of FIG. 1 is described further in U.S. Pat. No. 7,020,802 (issued Mar. 28, 2006), by inventors Kenny C. Gross and Larry G. Votta, Jr., entitled "Method and Apparatus for Monitoring and Recording Computer System Performance Parameters," which is incorporated herein by reference.

Figure 2:
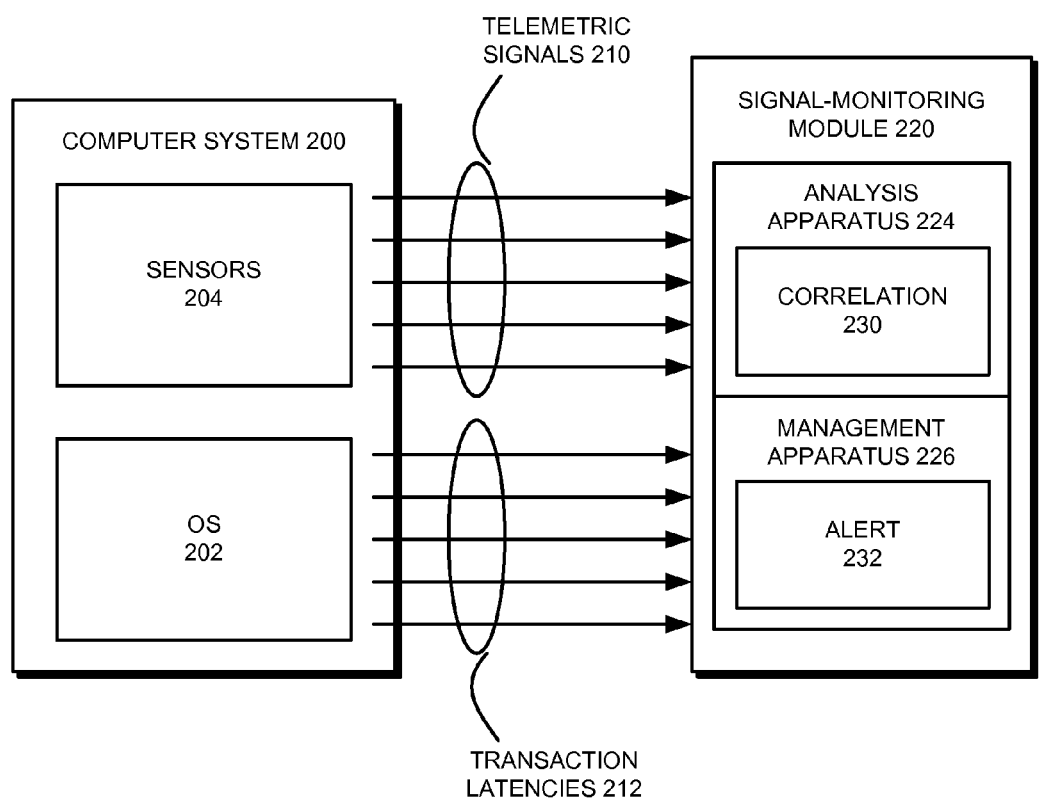
FIG. 2 shows a telemetry analysis system that examines both short-term real-time telemetry data and long-term historical telemetry data in accordance with the disclosed embodiments.

FIG. 2 shows a telemetry analysis system that examines both short-term real-time telemetry data and long-term historical telemetry data in accordance with an embodiment. In this example, a computer system 200 is monitored using a number of telemetric signals 210, which are transmitted to a signal-monitoring module 220. Signal-monitoring module 220 may assess the state of computer system 200 using telemetric signals 210. For example, signal-monitoring module 220 may analyze telemetric signals 210 to detect and manage faults in computer system 200 and/or issue alerts when there is an anomaly or degradation risk in computer system 200.

Signal-monitoring module 220 may be provided by and/or implemented using a service processor associated with computer system 200. Alternatively, signal-monitoring module 220 may reside within a remote monitoring center (e.g., remote monitoring center 120 of FIG. 1) that obtains telemetric signals 210 from computer system 200 over a network connection. Moreover, signal-monitoring module 220 may include functionality to analyze both real-time telemetric signals 210 and long-term historical telemetry data. For example, signal-monitoring module 220 may be used to detect anomalies in telemetric signals 210 received directly from the monitored computer system(s). Signal-monitoring module 220 may also be used in offline detection of anomalies from the monitored computer system(s) by processing archived and/or compressed telemetry data associated with the monitored computer system(s).

Those skilled in the art will appreciate that computer system 200 may include a variety of hardware and/or software configurations. For example, computer system 200 may correspond to a new computer system with a recently released operating system (OS) 202 and high-performance processors, memory, storage, and/or cooling components. On the other hand, computer system 200 may be a legacy computer system with an older OS 202 and/or components.

In turn, the components and/or OS 202 of computer system 200 may affect the operation, maintenance and/or management of computer system 200. A newer computer system may be faster, more efficient, and/or more configurable than a legacy computer system but may also be more sensitive to environmentally triggered degradation in input/output (I/O) throughput than the legacy computer system.

More specifically, hard disk drives (HDDs) in the newer computer system may have higher areal density than HDDs in the legacy computer system. At these increased densities, a write head of an HDD may be required to hit a track that is less than 20 nanometers in width. In addition, the write head may be separated from a corresponding platter by a distance of several nanometers. Finally, the platter may be spinning at speeds of up to 15,000 revolutions per minute (rpm). Consequently, even low levels of vibration may degrade I/O throughput and inter-process communication (IPC) rates that depend on I/O throughput.

At the same time, cooling fans have become more powerful to compensate for the increased heat generated by hardware components in the newer computer system. For example, fans in the newer computer system may have fan speeds that vary with workload demand and ambient temperature. On the other hand, fans in the legacy computer system may operate at one or more fixed speeds. The varying fan speeds in the newer computer system may produce elevated vibration levels in both internally generated vibrations and externally generated vibrations (e.g., if the newer computer system is deployed in a metal rack with other computer systems containing variable-speed fans). Such elevated vibration levels may reduce the I/O throughput and IPC rates of the newer computer system by up to 85% and affect the performance of enterprise applications that provide online transaction processing (OLTP), video streaming, web servers, customer relationship management (CRM), and/or decision support systems (DSS).

I/O throughputs and latencies may also change with increases or decreases in ambient temperature that are independent of changes in fan speeds. In particular, an increase or decrease in ambient temperature above or below a threshold may cause the platter of an HDD to expand or contract. In response to the expansion or contraction, the HDD may perform read-after-write (RAW) operations to verify the integrity of data written to the platter. However, such RAW operations may reduce the I/O throughput of the HDD by around 50%. Moreover, temperatures in an array of HDDs may vary, such that HDDs near the front, inlet side of the array are the coldest, while HDDs near the back of the array are the warmest. Colder HDDs near the front may thus have slower I/O throughputs than warmer HDDs until RAW is triggered in HDDs that exceed an upper temperature threshold near the back of the array.

In turn, environmental factors such as temperature or vibration levels may trigger false alarms during monitoring of computer system 200 for software aging. As shown in FIG. 2, signal-monitoring module 220 may obtain a set of transaction latencies 212 of software running on computer system 200. Transaction latencies 212 may be provided by an operating system (OS) 202 and/or one or more applications on computer system 200. For example, OS 202 may periodically perform an atomistic transaction on computer system 200, measure the transaction latency of the transaction, and transmit the measured transaction latency to signal-monitoring module 220 to enable detection of software aging in computer system 200 by signal-monitoring module 220. If an increase in transaction latencies 212 is detected, signal-monitoring module 220 may generate an alert (e.g., alert 232) of software aging in computer system 200.

However, as described above, increases in transaction latencies 212 may also be caused by increased vibration levels, changes in ambient temperature, and/or other environmental factors instead of resource contention, memory leaks, accumulation of round-off errors, latching in shared memory pools, and/or other factors associated with software aging. Consequently, signal-monitoring module 220 may incorrectly generate an alert (e.g., alert 232) of software aging in computer system 200 when changes in vibration levels, ambient temperatures, and/or other environmental factors cause I/O throughput in computer system 200 to drop.

In one or more embodiments, the system of FIG. 2 includes functionality to distinguish between environmentally triggered I/O degradation and I/O degradation caused by software aging in computer system 200. In particular, an analysis apparatus 224 in signal-monitoring module 220 may analyze telemetric signals 210 and transaction latencies 212 to identify potential environmental factors that may affect transaction latencies 212. Once a potential cause of increased transaction latencies 212 is found, a management apparatus 226 in signal-monitoring module 220 may generate an alert 232 describing the potential cause of the increased transaction latencies 212.

Prior to analyzing telemetric signals 210 and transaction latencies 212, analysis apparatus 224 may aggregate and pre-process telemetric signals 210 and transaction latencies 212. During pre-processing of telemetric signals 210 and transaction latencies 212, analysis apparatus 224 may synchronize disparate sampling streams by standardizing timestamps of telemetric signals 210 and transaction latencies 212 from different domains. Next, analysis apparatus 224 may transform telemetric signals 210 and transaction latencies 212 into signals with uniform sampling rates. For example, analysis apparatus 224 may use an analytical re-sampling process (ARP) to up-sample signals with slower sampling rates to match the highest sampling rates in the aggregation of monitored telemetric signals 210 and transaction latencies 212.

Next, analysis apparatus 224 may monitor transaction latencies 212 to detect upward or downward trends in transaction latencies 212. For example, analysis apparatus 224 may use a slope-estimation technique such as a regression technique to identify an overall trend in transaction latencies 212 over a time window (e.g., a number of hours, days, or weeks).

If an upward or downward trend in transaction latencies 212 is identified, analysis apparatus 224 may analyze telemetric signals 210 and transaction latencies 212 for a correlation 230 between transaction latencies 212 and one or more environmental factors represented by a subset of telemetric signals 210. For example, analysis apparatus 224 may use a nonlinear, nonparametric regression technique to generate one or more correlation coefficients such as a Pearson correlation coefficient, Spearman's correlation coefficient, and/or Kendall rank correlation coefficient between one or more subsets of telemetric signals 210 and transaction latencies 212.

In one or more embodiments, the nonlinear, nonparametric regression technique used by analysis apparatus 224 corresponds to a multivariate state estimation technique (MSET). Analysis apparatus 224 may be trained using historical telemetry data from computer system 200 and/or similar computer systems. The historical telemetry data may be used to determine correlations among various telemetric signals 210 and transaction latencies 212 collected from the monitored computer system(s).

Those skilled in the art will appreciate that the nonlinear, nonparametric regression technique used in analysis apparatus 224 may be provided by any number of pattern-recognition techniques. For example, see [Gribok] "Use of Kernel Based Techniques for Sensor Validation in Nuclear Power Plants," by Andrei V. Gribok, J. Wesley Hines, and Robert E. Uhrig, The Third American Nuclear Society International Topical Meeting on Nuclear Plant Instrumentation and Control and Human-Machine Interface Technologies, Washington, D.C., Nov. 13-17, 2000. This paper outlines several different pattern-recognition approaches. Hence, the term "MSET" as used in this specification can refer to (among other things) any of the 25 techniques outlined in [Gribok], including Ordinary Least Squares (OLS), Support Vector Machines (SVM), Artificial Neural Networks (ANNs), MSET, or Regularized MSET (RMSET).

If a correlation coefficient between transaction latencies 212 and a subset of telemetric signals 210 exceeds a threshold, analysis apparatus 224 may identify correlation 230 between transaction latencies 212 and an environmental factor represented by the subset of telemetric signals 210. As mentioned above, the environmental factor may include a vibration level experienced by computer system 200 and/or RAW operations in computer system 200. Because the vibration level is affected by fan speeds in computer system 200 and/or other computer systems in proximity to computer system 200, a positive correlation 230 between transaction latencies 212 and the fan speeds may indicate that transaction latencies 212 are affected by vibration levels in computer system 200. Similarly, RAW operations in computer system 200 may be triggered by changes in ambient temperature above a high-temperature threshold (e.g., 55° C.) and/or below a low-temperature threshold (e.g., 19° C.). As a result, a positive or negative correlation 230 between transaction latencies 212 and the ambient temperature may indicate that transaction latencies 212 are affected by RAW operations in computer system 200.

Analysis apparatus 224 may also include functionality to detect correlations between transaction latencies 212 and other environmental factors. For example, analysis apparatus 224 may correlate transaction latencies 212 with sound levels from one or more microphones in and around computer system 200 to identify potential acoustics-related degradation in I/O throughput in computer system 200.

After correlation 230 between transaction latencies 212 and a given environmental factor is identified, management apparatus 226 may generate alert 232 indicating that the environmental factor may be contributing to the trend in transaction latencies 212. For example, alert 232 may indicate a reduction in I/O throughput that is potentially caused by vibration levels if a positive correlation 230 between transaction latencies 212 and fan speeds in computer system 200 is found. Alert 232 may alternatively or additionally indicate a reduction in I/O throughput that is potentially caused by RAW operations if a positive or negative correlation 230 between transaction latencies 212 and ambient temperature in computer system 200 is found.

If no correlation 230 between transaction latencies 212 and any of the environmental factors is detected by analysis apparatus 224, analysis apparatus 224 may identify software aging as a possible cause of reduced I/O throughput or IPC rates in computer system 200. In turn, management apparatus 226 may perform one or more actions to remedy software aging in computer system 200. For example, management apparatus 226 may generate an alert of software aging in computer system 200, restart one or more processes associated with the upward trend in transaction latencies 212, flush stale locks, and/or defragment memory to mitigate performance degradation associated with software aging in computer system 200.

By correlating transaction latencies 212 and environmental factors that may affect software performance, signal-monitoring module 220 may reduce ambiguity in distinguishing between environmentally triggered performance degradation and software-aging-related performance degradation in computer system 200. Consequently, signal-monitoring module 220 may improve root cause analysis and resolution of software performance issues in computer system 200.

Figure 3:
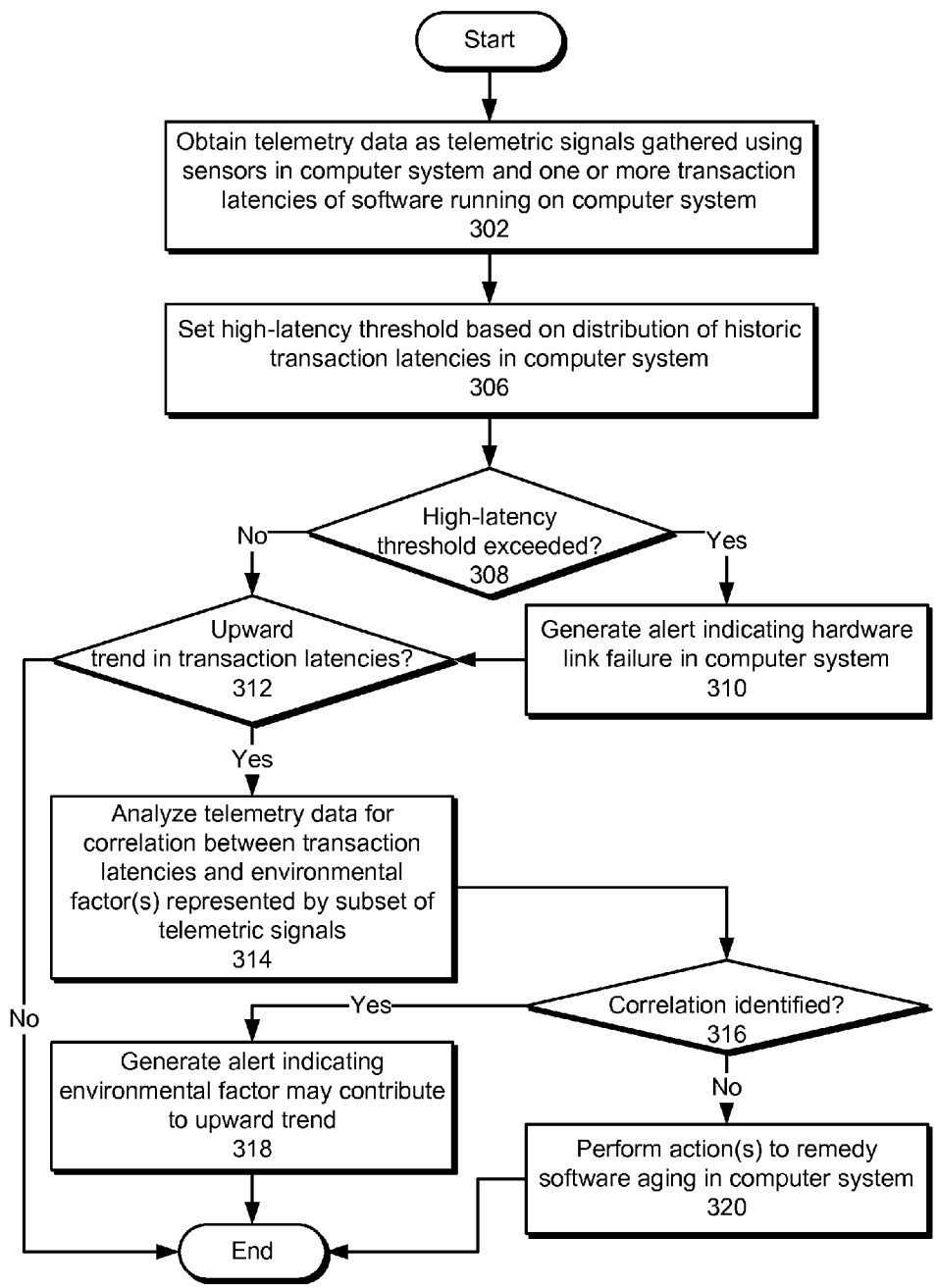
FIG. 3 shows a flowchart illustrating the process of analyzing telemetry data from a computer system in accordance with the disclosed embodiments.

FIG. 3 shows a flowchart illustrating the process of analyzing telemetry data from a computer system in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the technique.

First, the telemetry data is obtained as telemetric signals gathered using sensors in the computer system and one or more transaction latencies of software running on the computer system (operation 302). The telemetry signals may include load metrics, CPU utilizations, idle times, memory utilizations, disk activity, transaction latencies, temperatures, voltages, fan speeds, sound levels, and/or currents. The transaction latencies may include application- and/or OS-level latencies and/or user wait times.

Next, a high-latency threshold is set based on a distribution of historic transaction latencies in the computer system (operation 306). The high-latency threshold may represent a level of latency that is indicative of a hardware link failure in the computer system. For example, the latency threshold may be calculated as a percentile (e.g., 80-90%) of transaction latencies in the computer system over the previous number of months.

The high-latency threshold may be exceeded (operation 308) by an increase in the transaction latencies. If the high-latency threshold is exceeded, an alert indicating a hardware link failure in the computer system is generated (operation 310). For example, the alert may indicate that a sharp rise in one or more of the transaction latencies may potentially be caused by a failure of a network interface card (NIC) in the computer system. If the high-latency threshold is not exceeded, an alert of a hardware link failure in the computer system is not generated.

An upward trend in the transaction latencies may also be detected (operation 312), independently of transaction latencies that exceed the high-latency threshold. For example, a slope-estimation technique may be used to identify a gradual increase in the transaction latencies over a period of minutes, hours, days, or weeks. If no upward trend in the transaction latencies is detected, no additional alerts are generated, and the telemetry data may continue to be monitored for signs of software and/or IPC degradation.

If an upward trend in the transaction latencies is detected, the telemetry data is analyzed for a correlation between the transaction latencies and one or more environmental factors represented by a subset of the telemetric signals (operation 314). For example, a nonlinear, nonparametric regression technique may be applied to the telemetric signals and transaction latencies to produce one or more correlation coefficients between the transaction latencies and the environmental factor(s). A correlation between the transaction latencies and an environmental factor may then be identified (operation 316). Continuing with the above example, a correlation between the transaction latencies and the environmental factor may be identified if the correlation coefficient exceeds a coefficient threshold.

If a correlation between the transaction latencies and an environmental factor is identified, an alert indicating that the environmental factor may contribute to the upward trend in transaction latencies is generated (operation 318). For example, an indication and/or alert of a vibration-related increase in transaction latencies may be stored and/or generated if a correlation between the transaction latencies and fan speeds in the computer system is identified. In another example, an alert of a RAW-related increase in transaction latencies may be generated if a correlation between the transaction latencies and ambient temperatures in the computer system is identified.

If no correlation is identified between the transaction latencies and any of the environmental factors, one or more actions are performed to remedy software aging in the computer system (operation 320). For example, an alert of software aging in the computer system may be generated. One or more processes associated with the upward trend in the transaction latencies may also be restarted to mitigate performance degradation associated with the software aging.

Figure 4:
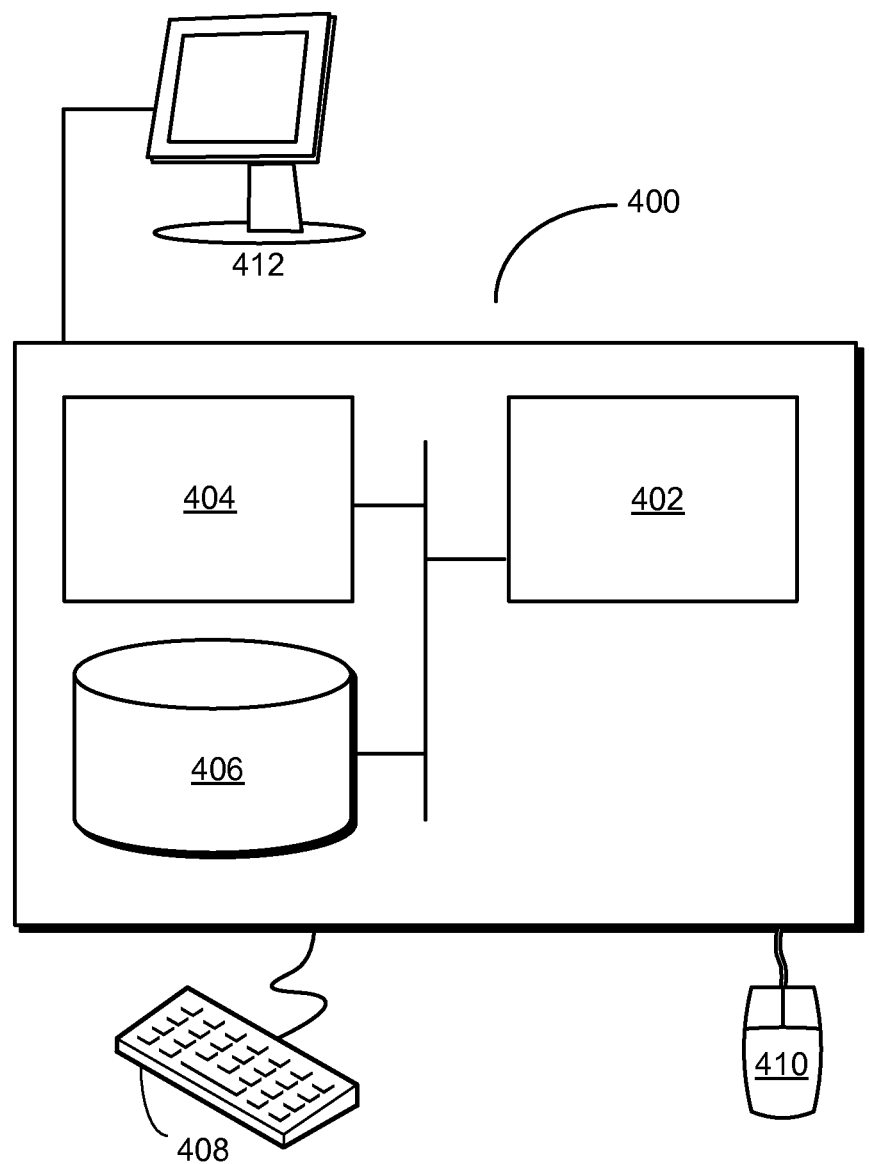
FIG. 4 shows a computer system in accordance with the disclosed embodiments.

FIG. 4 shows a computer system 400. Computer system 400 includes a processor 402, memory 404, storage 406, and/or other components found in electronic computing devices. Processor 402 may support parallel processing and/or multi-threaded operation with other processors in computer system 400. Computer system 400 may also include input/output (I/O) devices such as a keyboard 408, a mouse 410, and a display 412.

Computer system 400 may include functionality to execute various components of the present embodiments. In particular, computer system 400 may include an operating system (not shown) that coordinates the use of hardware and software resources on computer system 400, as well as one or more applications that perform specialized tasks for the user. To perform tasks for the user, applications may obtain the use of hardware resources on computer system 400 from the operating system, as well as interact with the user through a hardware and/or software framework provided by the operating system.

In particular, computer system 400 may provide a system that analyzes telemetry data from a computer system. The system may include a monitoring mechanism that obtains the telemetry data as telemetric signals gathered using sensors in the computer system and one or more transaction latencies of software running on the computer system. The system may also include a signal-monitoring module. Upon detecting an upward trend in the transaction latencies, the signal-monitoring module may analyze the telemetry data for a correlation between the transaction latencies and one or more environmental factors represented by a subset of the telemetric signals. Upon identifying a correlation between the transaction latencies and an environmental factor, the signal-monitoring module may generate an alert that indicates the environmental factor may be contributing to the upward trend in the one or more transaction latencies.

In addition, one or more components of computer system 400 may be remotely located and connected to the other components over a network. Portions of the present embodiments (e.g., monitoring mechanism, signal-monitoring module, analysis apparatus, management apparatus, etc.) may also be located on different nodes of a distributed system that implements the embodiments. For example, the present embodiments may be implemented using a cloud computing system that provides a remote monitoring and analysis framework for a set of computer servers.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
   obtaining telemetry data, wherein the telemetry data comprises:
      first information comprising telemetric signals gathered using sensors in a computer system; and
      second information that indicates one or more transaction latencies of software running on the computer system;
   upon detecting an upward trend in the one or more transaction latencies, analyzing, by another computer system, the telemetry data for a correlation between the one or more transaction latencies and one or more environmental factors represented by a subset of the telemetric signals;
   upon identifying the correlation between the one or more transaction latencies and an environmental factor, storing an indication that the environmental factor potentially contributes to the upward trend in the one or more transaction latencies; and
   upon detecting a lack of correlation between the one or more transaction latencies and any of the one or more environmental factors, performing one or more actions to remedy software aging in the computer system.

2. The method of claim 1, further comprising:
   upon detecting that the one or more transaction latencies are above a high-latency threshold, generating an alert indicating a hardware link failure in the computer system.

3. The method of claim 2, further comprising:
   setting the high-latency threshold based on a distribution of historic transaction latencies in the computer system.

4. The method of claim 1,
   wherein the subset of the telemetric signals comprises a set of fan speeds, and
   wherein the environmental factor comprises a vibration level experienced by the computer system.

5. The method of claim 1,
   wherein the subset of the telemetric signals comprises a set of temperatures, and
   wherein the environmental factor comprises read-after-write (RAW) operations in the computer system.

6. The method of claim 1, wherein the upward trend in the one or more transaction latencies is detected using a slope-estimation technique.

7. The method of claim 1, wherein analyzing the correlation between the one or more transaction latencies and the subset of the telemetric signals comprises:
   calculating a correlation coefficient between the one or more transaction latencies and the subset of the telemetric signals.

8. The method of claim 1, wherein the indication is an alert that is transmitted to a recipient that is registered to monitor alerts for the computer system.

9. An apparatus, comprising:
   one or more processors; and
   memory storing instructions that, when executed by the one or more processors, cause the apparatus to:
      obtain telemetry data, wherein the telemetry data comprises:
         first information comprising telemetric signals gathered using sensors in a computer system; and
         second information that indicates one or more transaction latencies of software running on the computer system;
      upon detecting an upward trend in the one or more transaction latencies, analyze the telemetry data for a correlation between the one or more transaction latencies and one or more environmental factors represented by a subset of the telemetric signals;
      upon identifying the correlation between the one or more transaction latencies and an environmental factor, storing an indication that the environmental factor potentially contributes to the upward trend in the one or more transaction latencies; and upon detecting a lack of correlation between the one or more transaction latencies and any of the one or more environmental factors, perform one or more actions to remedy software aging in the computer system.

10. The apparatus of claim 9, wherein the memory further stores instructions that, when executed by the one or more processors, cause the apparatus to:
upon detecting that the one or more transaction latencies are above a high-latency threshold, generate an alert indicating a hardware link failure in the computer system.

11. The apparatus of claim 9, wherein the one or more actions comprise at least one of:
generating an alert of software aging in the computer system; and
restarting one or more processes associated with the upward trend in the one or more transaction latencies.

12. The apparatus of claim 9,
wherein the subset of the telemetric signals comprises a set of fan speeds, and
wherein the environmental factor comprises a vibration level experienced by the computer system.

13. The apparatus of claim 9,
wherein the subset of the telemetric signals comprises a set of temperatures, and
wherein the environmental factor comprises read-after-write (RAW) operations in the computer system.

14. The apparatus of claim 9, wherein the indication is an alert that is transmitted to a recipient that is registered to monitor alerts for the computer system.

15. A non-transitory computer-readable storage medium storing instructions that when executed by a computer cause the computer to perform a method, the method comprising:
obtaining telemetry data, wherein the telemetry data comprises:
first information comprising telemetric signals gathered using sensors in a computer system; and
second information that indicates one or more transaction latencies of software running on the computer system;
upon detecting an upward trend in the one or more transaction latencies, analyzing, by another computer system, the telemetry data for a correlation between the one or more transaction latencies and one or more environmental factors represented by a subset of the telemetric signals;
upon identifying the correlation between the one or more transaction latencies and an environmental factor, storing an indication that the environmental factor potentially contributes to the upward trend in the one or more transaction latencies; and
upon detecting a lack of correlation between the one or more transaction latencies and any of the one or more environmental factors, perform one or more actions to remedy software aging in the computer system.

16. The non-transitory computer-readable storage medium of claim 15, wherein the indication is an alert that is transmitted to a recipient that is registered to monitor alerts for the computer system.

17. The non-transitory computer-readable storage medium of claim 15,
wherein the subset of the telemetric signals comprises a set of fan speeds, and
wherein the environmental factor comprises a vibration level experienced by the computer system.

18. The non-transitory computer-readable storage medium of claim 15,
wherein the subset of the telemetric signals comprises a set of temperatures, and
wherein the environmental factor comprises read-after-write (RAW) operations in the computer system.

* * * * *